United States Patent
Modarresi

(10) Patent No.: US 10,909,145 B2
(45) Date of Patent: Feb. 2, 2021

(54) TECHNIQUES FOR DETERMINING WHETHER TO ASSOCIATE NEW USER INFORMATION WITH AN EXISTING USER

(71) Applicant: Adobe Inc., San Jose, CA (US)

(72) Inventor: Kourosh Modarresi, Stanford, CA (US)

(73) Assignee: Adobe Inc., San Jose, CA (US)

( * ) Notice: Subject to any disclaimer, the term of this patent is extended or adjusted under 35 U.S.C. 154(b) by 1098 days.

(21) Appl. No.: 14/939,083

(22) Filed: Nov. 12, 2015

(65) Prior Publication Data

US 2017/0140023 A1  May 18, 2017

(51) Int. Cl.
*G06F 16/28* (2019.01)

(52) U.S. Cl.
CPC .................. *G06F 16/285* (2019.01)

(58) Field of Classification Search
CPC .. G06Q 30/0269; G06F 16/535; G06F 16/285
See application file for complete search history.

(56) References Cited

U.S. PATENT DOCUMENTS

| | | | | |
|---|---|---|---|---|
| 8,676,804 B1* | 3/2014 | Janos | ................... | G06F 16/285 707/737 |
| 2003/0083938 A1* | 5/2003 | Smith | ................... | G06Q 30/02 705/14.53 |
| 2010/0121850 A1* | 5/2010 | Moitra | ............... | G06F 17/30861 707/737 |
| 2012/0246161 A1* | 9/2012 | Murakami | ........... | H04N 21/252 707/737 |
| 2012/0317117 A1* | 12/2012 | Akiyama | .......... | G06F 17/30572 707/737 |
| 2016/0253681 A1* | 9/2016 | de Souza | ........... | G06Q 30/0201 705/13 |

\* cited by examiner

*Primary Examiner* — Cheyne D Ly
(74) *Attorney, Agent, or Firm* — Kilpatrick Townsend & Stockton LLP

(57) ABSTRACT

Systems and methods for determining whether to associate new user information with an existing user are disclosed. One embodiment involves clustering users in a set of users into clusters based on similarities of personal or behavioral features of the users. The embodiment further involves receiving new user information relating to a user using a device that provides the new user information via a computer network. A best matching cluster of the clusters is identified based on similarity of personal or behavioral features of the new user information to personal or behavioral features of the best matching cluster. The embodiment compares the personal or behavioral features of the new user information with personal or behavioral features of an existing user in the best matching cluster to determine whether to associate the new user information with the existing user or to assign it as a new (previously non-existent and unknown) user.

13 Claims, 6 Drawing Sheets

| User | visit_num:Count | visit_num:Max | hit_time_gmt:AvgVisitTime | visit_num:AvgVisitLength | 'igender' | 'irecipientid' | 'istatus' | 'saddress3' | 'scity" | 'semail' |
|---|---|---|---|---|---|---|---|---|---|---|
| 1 | 8 | 1 | 1192 | 8 | 0 | 0 | 0 | 123 Red St. | San Jose | abc@sample.sam |
| 2 | 70 | 681 | 606 | 1 | 1 | 717341 | 0 | 124 Blue St. | Cupertino | def@sample.sam |
| 3 | 4 | 5 | 112 | 4 | 2 | 717342 | 0 | 125 Green St. | Seattle | ghi@sample.sam |
| 4 | 15 | 20 | 932 | 7 | 2 | 717343 | 0 | 126 Yellow St. | Atlanta | klm@sample.sam |
| 5 | 22 | 6 | 1939 | 7 | 1 | 717344 | 0 | 127 Grey St. | Marietta | nop@sample.sam |
| 6 | 7 | 1 | 953 | 7 | 2 | 717345 | 0 | 128 White St. | Roswell | qrs@sample.sam |

TECHNIQUES FOR DETERMINING WHETHER TO ASSOCIATE NEW USER INFORMATION WITH AN EXISTING USER

FIELD OF THE INVENTION

This disclosure relates generally to computer-implemented methods and systems and more particularly relates to improving the efficiency and effectiveness of computing systems used in collecting, associating, and using user behavior information from computers, mobile devices, and other electronic devices.

BACKGROUND OF INVENTION

The number and types of devices that collect data about users continues to grow. Many users now have desktop computers, laptops, tablets, gaming devices, cell phones, and/or home appliances such as refrigerators, thermostats, and toasters, and use such devices in a variety of circumstances such as at home, at work, at the library, at school, in the car, etc. Moreover, many individuals have multiple accounts, such as e-mail accounts (with different names), multiple addresses, phone numbers and so on. Also, many features of such accounts, such as first name, last name, addresses etc., are not unique and are shared by many individuals. Because of differences and overlapping use of devices, account information, and the variety of circumstances of use, user behavior data related to a particular user's behavior is often not associated with the single user. Datasets include duplicative records for a given user, failing to recognize that the information about two "different" users actually relates to a single user. Thus, while many devices are configured with monitoring and information tracking capabilities capable of collecting a massive amount of user behavior data, such information often is not consolidated information providing comprehensive information about individual users. As a result, marketers and others wishing to provide targeted content to the users do not have appropriate consolidated user behavior information to effectively personalize email campaign (or web design, ads, web content, shopping) and other content provided to users.

Existing techniques attempt to use cookies and other device-specific information to identify when new user data is associated with existing users. However, such techniques at best identify instances of a given user using a same web browser or other application on a same device and thus fail to identify instances of a user using different devices or different applications. Moreover, cookie-based techniques are also ineffective because many users delete the cookies stored on their devices. In short, existing techniques do not effectively and efficiently recognize user data as associated with an existing user and thus do not adequately support providing targeted content to such users.

SUMMARY

Systems and methods for determining whether to associate new user information with an existing user are disclosed. One embodiment involves clustering users in a dataset of users into clusters based on similarities of personal or behavioral features of the users. The embodiment further involves receiving new user information relating to a user using a device that provides the new user information via a computer network. The new user information is compared with the clusters of users in the dataset. A best matching cluster of is identified based on similarity of personal or behavioral features of the new user information to personal or behavioral features of the best matching cluster. The embodiment compares the personal or behavioral features of the new user information with personal or behavioral features of an existing user in the best matching cluster to determine whether to associate the new user information with the existing user or to assign it as a new (previously non-existent and unknown) user.

These illustrative features are mentioned not to limit or define the disclosure, but to provide examples to aid understanding thereof. Additional embodiments are discussed in the Detailed Description, and further description is provided there.

DETAILED DESCRIPTION

Figure 1:
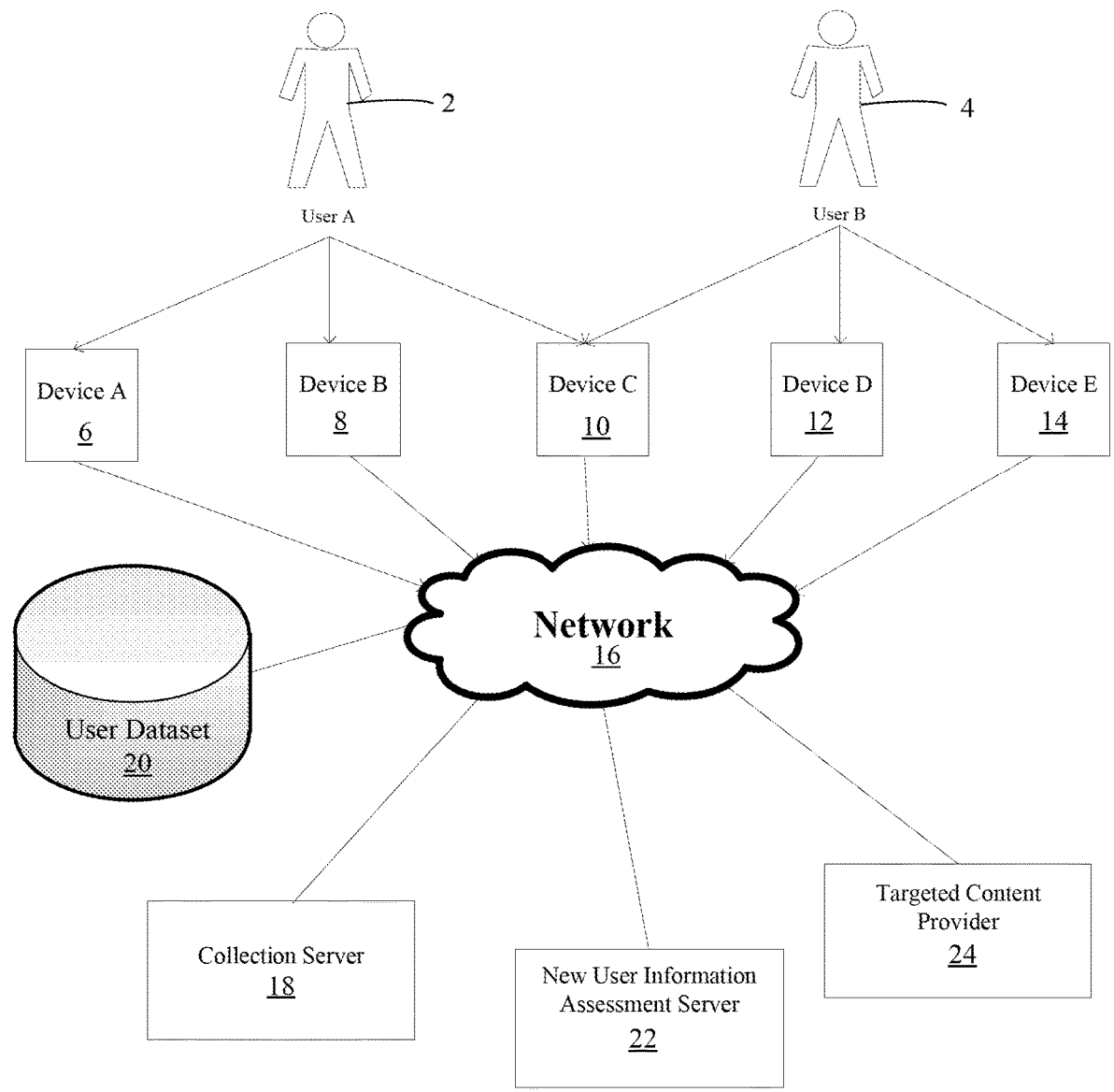
FIG. 1 is a block diagram depicting an example of a system for determining whether to associate new user information with an existing user.

As described above, existing user data tracking techniques do not effectively and efficiently recognize new user data as associated with an existing user and thus do not adequately support providing targeted content to such users. Embodiments of the invention more accurately and efficiently determine whether to associate new user information with an existing user. In one embodiment, new user information relating to a user using a device is compared with information about one or more existing users to determine whether there is sufficient similarity to associate the new user information with an existing user. For example, the technique may identify that the user last name matches, the user first name matches, the e-mail address differs, the gender matches, the city matches, the average visit length is similar, etc., and based on the collective similarities or differences of features determine that the users are the same, i.e., that the information about the new user should be added to the information about the existing user. In one embodiment, multiple personal and/or behavioral features of users are used to provide a form of a digital finger print that is relatively unique for every user. The personal and/or behavioral features found in new user information is then used to determine whether the new user information is a match for a digital fingerprint of any of the existing users. These techniques allow user features to be combined (based on identifying that the new user information is associated with an existing user) to provide a more comprehensive view of the user. Among other benefits, this allows marketers and other content providers to provide better targeted marketing, advertising other content. For example, by knowing the user better, a marketing campaign is created that is more specific and personalized and ultimately is expected to provide better results.

The user data tracking techniques disclosed herein will often involve a dataset of existing users that is so large (e.g., thousands, millions, or even billions of users) that comparing new user information with every existing user is infeasible or impractical. One aspect of the invention addresses this problem by identifying a small set of one or more existing users for the comparison. The small set of one or more users is identified using a clustering technique that groups existing users into clusters based on similarities of user data of the users. The new user information is then only compared with the users in the cluster to which it is most similar. In very large sets of user data, clusters are subclustered into successively smaller and smaller sub-clusters until a sub-cluster of a suitable size (e.g., having less than a threshold number of users) is found. Clustering and subclustering and then comparing new user data with only a small set (e.g., a best matching cluster) of users will generally be far more efficient than comparing new user information with information about every user in a dataset.

The user data tracking techniques disclosed herein will often involve a dataset of information about existing users that includes tens, hundreds, or ever more features about each user. Examples of personal features include first name, middle name, last name, residence address, residence city, residence state, residence country, e-mail address, date of birth, gender, marital status, and numerous other items of personal information. The features will also include user interaction and other behavior data such as information about websites visited, click-through events, purchases and other conversions, wish lists, interests, home thermostat settings, information from the Internet of Things ("IoT"), and numerous other pieces of information related to actions associated with users using electronic devices that provide information via a computer network. Clustering users having large numbers of features is computationally expensive and time consuming. One aspect of the invention addresses this problem using a dynamic clustering technique. In one example of this, the clustering involves dynamically weighting features of the user data and setting weightings of features below a predetermined threshold to zero. A clustering algorithm, such as a k-means algorithm, is then used to cluster the users. The use of such dynamic clustering dramatically improves efficiency of the clustering without significantly compromising the accuracy of the clustering.

The techniques disclosed herein provide numerous benefits over prior user data tracking techniques. Using multiple features of personal and/or behavior information to compare new user information with existing user information allows for more accurate determination of whether new user information is for an existing user. The use of clustering and selective comparison with only some clusters makes such a comparison of new user information more efficient and computationally practical for large user sets. The use of dynamic clustering further improves the efficiency and practicality of clustering for implementations involving large numbers of user features. These techniques and the other aspects of various embodiments disclosed herein used individually or in combination generally facilitate more accurate and efficient determination of whether new user information should be associated with an existing user or used to create a new user in the dataset. Because the computations are more efficient, the dataset can be updated with new user information more frequently and/or with less computational costs. The more up-to-date and more accurate dataset is then available for use by marketers and other targeted content providers to provide better targeted content to the users.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the term "user" refers to an individual that uses one or more devices that provide information over a network.

As used herein, the term "device" refers to an apparatus that includes electronics, software, sensors, or network connectivity, which enables the apparatus to receive information, use information, display information, collect information, control another apparatus, sense an environmental condition, or perform any other electronic device function. Examples of devices include, but are not limited to, a desktop computer, a laptop, a tablet, a cell phone, a television, a video camera, a camera, a wearable device such as a watch, a barbeque thermometer, a lamp, an in-ceiling light, a light switch, a navigation apparatus, a car audio system, in-home appliances, refrigerators, microwaves, ovens, toasters, blenders, dishwashers, thermostats, alarm clocks, fitness equipment, heaters, air-conditioners, humidifiers, security systems, floor sensors, movement sensors, surveillance apparatus, and electronic door and window lock mechanisms. A particular user may own or use one device or many devices. Each device may be used to perform particular functions, or the devices may have overlapping functions.

As used herein the term "new user information" refers to any personal or behavioral information that is not already associated with a user in a user dataset. Examples of new user information include, but are not limited to, information about a purchase transaction, information about a user clicking on a link in an e-mail advertisement, personal information from a use setting up a new customer account profile, and information from an Internet of Things (IoT) device.

As used herein the term "existing user" refers to a user for whom information is already stored in a dataset that will be used to determine whether new user information is for an existing user.

As used herein the term "personal feature" refers to an item of information about a user that relates to the user's identity, residence, family, occupation, individual characteristics, interests, account credentials, and the like. Examples of personal features include first name, middle name, last name, residence address, residence city, residence state, residence country, e-mail address, date of birth, gender, marital status, spouses name, children names, dependent names, healthcare provider, employer, school, education level, date of graduation, employer address, social security number, and numerous other items of personal information.

As used herein the term "behavioral feature" refers to an item of information about a user activity captured by a device or a user interaction with a device that provides information about the activity or interaction over a computer network. Examples of behavioral features include information about websites visited, click-through events, purchases and other conversions, wish lists, interests, home thermostat settings, information from the Internet of Things ("IoT") about a user, and numerous other pieces of information related to actions associated with users using, or user activities captured by, devices that provide information via a computer network.

As used herein the terms "Internet-of-Things" and "IOT" refer to the network of physical objects or "things" embedded with electronics, software, sensors, and other devices and network connectivity, which enables these objects to collect and exchange data.

Referring now to the drawings, FIG. 1 is a block diagram depicting an example of a system for determining whether to associate new user information with an existing user. user A 2, and user B 4, represent users associated with certain behavior that is tracked. Device A 6, device B 8, device C 10, device D 12, and device E 14, represent devices that are used by user A 2 and user B 4 to access the network 16, such as the internet. In this example, user A 2 accesses the network 16 with device A 6, device B 8, and device C 10; and user B 4 accesses the network 16 with device C 10, device D 12, and device E 14. Both user A 2 and user B 4 access the Network 16 with device C 10. It is possible for users to use any number of devices and for each device to be shared by any number of users.

The devices 6-14 provide information about use of the devices (e.g., interactions and other user behaviors) to collection server 18, which stores user information for a dataset 20 of users. The new user information assessment server 22 determines how to treat new user information. Specifically, the new user information assessment server 22 determines whether to associate new user information with an existing user or to create a new user in the user dataset 20 for the new user information. Targeted content provider 24 uses information in the user dataset 20 to provide targeted e-mails, advertising, and/or other targeted content to users, such as user A 2 and user B 4.

Figures 2, 3:
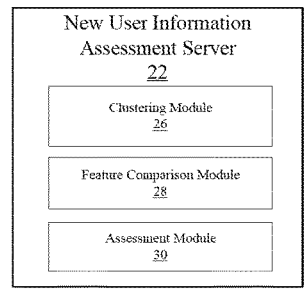
FIG. 2 is a block diagram depicting an example of modules of the new user information assessment server of FIG. 1.
FIG. 3 is a chart depicting a sample dataset of existing user information.

FIG. 2 is a block diagram depicting an example of modules of the new user information assessment server 22 of FIG. 1. The new user information assessment server 22 includes modules 202, 204, and 206, which each are implemented by a processor executing stored computer instructions. Clustering module 26 provides identifies clusters and sub-clusters of users in the user dataset 20 (FIG. 1) based on personal and/or behavioral features of the users. Feature comparison module 28 compares new user information, such as personal and/or behavioral features, with information about one or more of the users in the dataset. In one embodiment, the comparison is limited to only users in a cluster or sub-cluster of the dataset that is most similar to the new user information. The comparison determines whether to associate new user information with an existing user or to create a new user in the user dataset 20 (FIG. 1) for the new user information. Based on the results of these comparisons, the update module 28 accesses the user dataset 20 (FIG. 1) to add new users and/or supplement existing user information.

FIG. 3 is a chart depicting an example dataset of existing user information. In this example, the data is in matrix structure form, with each rows for an individual user, compiling information about the user in a single row, and each column for a feature of the user. For ease of presentation, the example shows only a small number of columns and rows. The number of users (i.e., rows) and the number of features (i.e., columns) in most real world implementations will generally be far more numerous. In one example, a dataset includes over 350 features and over 10,000 users. In the example of FIG. 3, the "visit_num:Count (The total number of visits)" feature represents the number of times the user has visited a site, the "visit_num:Max" (The maximum number of visits—on any page) feature represents the maximum number of times the user has visited a page. The "hit_time_gmt:AvgVisitTime" feature represents time of visit and the expected time the user visits the page (the most probable time user visits the page). The "visit_num (The number of visit; $1^{st}$, $2^{nd}$, ... ):AvgVisitLength" (The average length of a visit) feature represents the average length of a visit. The "igender" feature represents the user's gender. The "istatus" feature represents the user's status. The "saddress3" feature represents street address line 3. The "scity" feature represents user's city name. The "semail" feature represents the user's e-mail address.

Additional exemplary variables include scountrycode (country code), sstatecode (state), sfirstname (first name), slanguage (language), AngVisitTime (Average time spent by user on any visit), Visit Length (the length visit by user), "number of clicks", and "average visit time", visit_num: Max, hit_time_gmt, MostFrequent browser, 'igender' (user gender), 'irecipientid' (id of the campaign for the user), 'saccount', 'saddress1', 'saddress2', 'saddress3', 'saddress4', 'scompany' (company user works at), 'semail' (user email), 'sfax' (user fax number), 'slastname' (last name), Recent Visit (recent visit time), PageViews (the page viewed by user), Revenue, Orders, Months Visited, Days Visited, Number of Links Opened, Note that variables need not have any physical meaning to be used with the models and algorithms discussed herein. Each variable is a mathematical entity and will be treated by the models as such, regardless of physical meaning or lack thereof. Models (as an example, the dynamic clustering model) will figure which variables are more significant and give the corresponding weights to each variable. Example of variables with no physical description are: event97 [Cross-Sell Widget Loaded], Evar 1, Evar 2, etc. There are a variety of reasons that to use variables with no physical descriptions. One reason is to protect privacy and company restriction and to prevent possible misuse of data.

One embodiment of determining whether to associate new user information with an existing user or to create a new user in the user dataset involves identifying new user information and recognizing whether it is for an existing user A, an existing user B, or whether the new user information should be used to create a new user in the user dataset. This determining is based on looking at an imprint from the user's behavior and comparing it with background historical user behavior. Using personal and/or behavioral information about the user can reduce or eliminate the use of device/application specific data such as cookie data and the like. Moreover, using multiple features of the user provides greater accuracy than using just one feature (e.g., just an e-mail address).

Certain embodiments iteratively divide users into different groups to improve the process of comparing new user information with existing user information. For example, if there are 100 users in the dataset, i.e., data points x1 to x100, and new user information is received, the determination of whether the new user information matches any existing user's information can involve comparing the user to only a few or even only one existing user. In this example, the system attempts to determine if the new user information is for a totally new user or if the new user information corresponds to one that is x1 to x100. The 100 users in the dataset are clustered into 10 groups and the technique determines that the new user information is closest to group 5. The users in group 5 are again clustered into subgroups and the new user information is compared with each subgroup to identify a best matching subgroup, for example sub-group 3, which has only 1 user. The new user information is then compared with only that one existing user to determine whether the new user information is sufficiently similar, e.g., using a 98% similarity threshold or any other appropriate threshold. In larger datasets, sub-clustering and selecting a best matching sub-cluster continues iteratively until the sub-cluster is of a desirable small size, e.g., having only a few or one users. In this way, the iterative clustering technique reduces the dimensions of the matching problem, eliminating the need to compare new user information each existing user.

Figure 4:
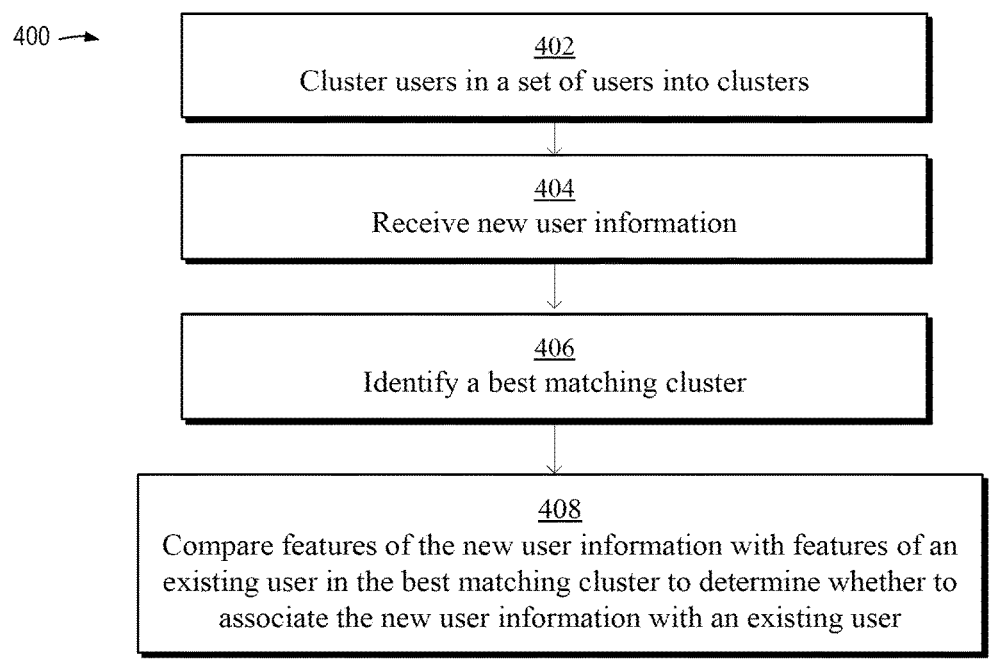
FIG. 4 is a flowchart illustrating an exemplary method for determining whether to associate new user information with an existing user.

FIG. 4 is a flowchart illustrating an exemplary method for determining whether to associate new user information with an existing user. Method 400 is performed in a computing environment in which use information is tracked for devices and is specifically performed by a device, such as the new user information assessment server 22 of FIG. 1, comprising a processor executing stored instructions.

Method 400 involves clustering users in a set of users into clusters, as shown in block 402. Clustering generally involves clustering based on similarities of personal and/or behavioral features of the users.

Method 400 further involves receiving new user information, as shown in block 404. The new user information relates to a user using a device that provides the new user information via a computer network. In one embodiment, the clustering uses a k-means clustering algorithm.

In one embodiment, dynamic clustering is used. In an exemplary dynamic clustering example, less than all of the user features of the users in the dataset are considered to be relevant to the clustering. Instead, a dynamic clustering algorithm is used to cluster users with only a small fraction of the features, e.g. of some of the columns in the dataset of FIG. 3. The dynamic clustering assigns different weights to different features. The weights are determined to minimize the inter-cluster dissimilarities:

$$\min_{k,C,w} \sum_{p=1}^{k} \sum_{C(i)=k} \sum_{C(i')=k} (D_{ii'})$$

where, $$D_{ii'} = D(x_i, x_{i'}) = \sum_{j=1}^{p} w_j d_j(x_{ij}, x_{i'j})$$

In one example, the algorithmic approach to compute the weights is done using a stochastic gradient decent method.

If a given features weight is less than a threshold, the weight for the cluster is assigned a zero. In an example involving hundreds of features, many (and often the majority) of the features are assigned a zero weight and the efficiency of the subsequent clustering computations is greatly improved.

Using this technique, reasonably accurate results are obtained efficiently. In one embodiment, results are obtained in real-time. In one embodiment, the clustering involves dynamic clustering that involves dynamically weighting the personal or behavioral features of the users in the set of users. The weightings of personal or behavioral features below a predetermined threshold are set to zero. A k-means clustering technique is applied using the weighted personal or behavioral features and reasonably accurate clusters are determined in a computationally efficient manner.

Method 400 further involves identifying a best matching cluster, as shown in block 406. This involves identifying a best matching cluster of the clusters based on similarity of personal or behavioral features of the new user information to personal or behavioral features of the best matching cluster. In one embodiment, the best matching cluster is identified based on the similarity of the personal or behavioral features of new user information to personal or behavioral features of a center point of the best matching cluster. Exemplary behavioral features include interaction with a website, Internet-of-Things (IoT) device, mobile device, or in-store device, etc. In one embodiment, identifying the best matching cluster involves weighting features differently and/or setting weights of some features to zero to reflect the relative significance of the features and/or to simplify the process.

Method 400 further involve comparing features of the new user information with features of an existing user in the best matching cluster to determine whether to associate the new user information with an existing user, as shown in block 408. In one embodiment this involves comparing the personal and/or behavioral features of the new user information with personal and/or behavioral features of an existing user in the best matching cluster. In one embodiment, based on similarity of the personal or behavioral features of the new user information with the personal or behavioral features of the existing user exceed a predetermined threshold, the new user information is associated with the existing user. Conversely, in one embodiment, based on similarity of the personal or behavioral features of the new user information with the personal or behavioral features of the existing user not exceeding such a predetermined threshold, a new user is created in the dataset with the new user information rather than associating the new user information with the existing user. In one embodiment, the comparison involves weighting features differently and/or setting weights of some features to zero to reflect the relative significance of the features and/or to simplify the comparison.

Figure 5:
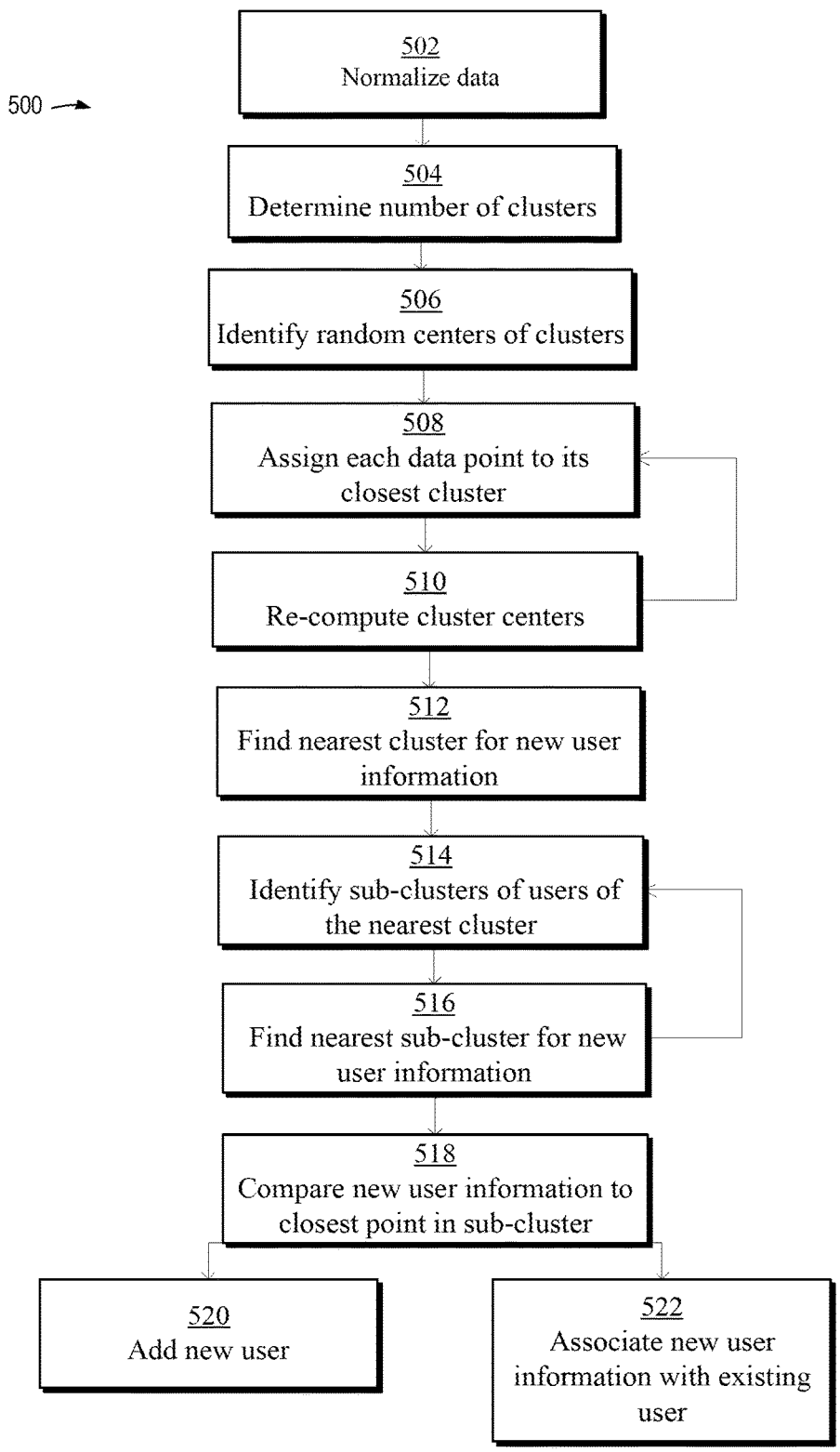
FIG. 5 is a flowchart illustrating another exemplary method for determining whether to associate new user information with an existing user.

FIG. 5 is a flowchart illustrating another exemplary method 500 for determining whether to associate new user information with an existing user. Method 500 is performed in a computing environment in which use information is tracked for devices and is specifically performed by a device, such as the new user information assessment server 22 of FIG. 1, comprising a processor executing stored instructions. Exemplary method 500 involves normalizing the data, as shown in block 502. In one embodiment, this involves centering and scaling the user feature data.

In block 504, method 500 involves determining a number of clusters, as shown in block 504. Computing the number of clusters is an important task in clustering, for example, using the K-means algorithm. One embodiment uses the criteria of minimizing the total (for all clusters) inter-cluster dissimilarities as the criteria for choosing the best number of clusters (k). One embodiment uses the Silhouette method that attempts to identify a number of clusters so that data points inside any cluster are as similar as possible and that different clusters are as dissimilar as possible from one another. In one example, this method is used on a set of training data to determine an appropriate number of clusters.

Figure 6:
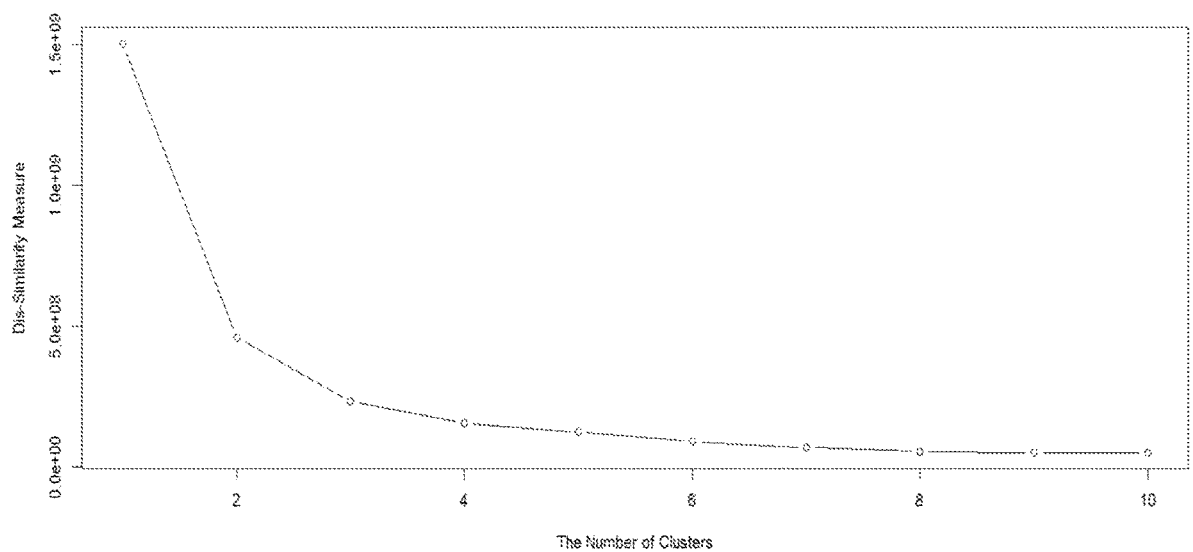
FIG. 6 is a plot illustrating an example of determining an appropriate number of clusters.

FIG. 6 is a plot illustrating an example of determining an appropriate number of clusters. In this example, the horizontal axis illustrates the number of clusters and the vertical axis is a similarity measure. The system attempts to ensure that inside each cluster. If there are only 2 clusters, then the points are not very similar. By increasing the number of clusters, the similarity increases inside each cluster. However, at some point increasing the number of clusters does not improve similarity as shown by the similarity flattens in between 4 and 6 clusters. This type of silhouette technique with appropriate parameters is used on a training set of user data to identify an appropriate number of clusters similarity in cluster and between clusters satisfy certain criteria.

Different implementations will involve selection and use of an appropriate clustering technique. A K-means clustering technique provides advantages in one embodiment. For any matrix X (in rows by n columns) the basic principal of K-means clustering model is to find clusters (C) where;

$$\min_{k,C} \sum_{p=1}^{k} \sum_{C(i)=k} \sum_{C(i')=k} (D_{ii'})$$

Where $D_{ii'}$ is the distance (dissimilarity between the points i and i'.

$$D_{ii'} = D(x_i, x_{i'})$$

Using dissimilarity matrix D, for original K-means clustering, it is defined as:

$$D_{ii'} = D(x_i, x_{i'}) = \sum_{j=1}^{P} d_j(x_{ij}, x_{i'j})$$

In this K-means clustering, all of the features make contributions to the computation of the dissimilarity between any two points giving equal importance to all of the features of any two vectors. However, such equal weighting misrepresents the significance of the features relative to one another. Certain features will have a greater correlation in terms of signifying the similarity of users to one another. For example, a matching e-mail address could be possibly more significant than a matching country.

Accordingly, one embodiment uses the following dynamic clustering technique:

$$D_{ii'} = D(x_i, x_{i'}) = \sum_{j=1}^{P} w_j d_j(x_{ij}, x_{i'j})$$

Where $w_j$ is the corresponding weight to the feature $x_j$. This model establishes variable weights assigned assigned to different features when forming clusters.

Returning to FIG. 5, the method 500 clusters the user data. Method 500 identifies random centers of clusters, as shown in block 506. In block 508, the method 500 next assigns each user data point to its closest cluster. In block 510, the method 500 re-computes the cluster centers. In one example, the cluster centers are re-computed as the average of all user points in the cluster (centroid as a K-means). The steps of blocks 508 and 510 are iteratively repeated until the data converges, i.e., until no further changes occur and the clusters are stable. The steps of blocks 502-510, in one embodiment, are performed on a training dataset prior to receiving new user information. In an alternative embodiment, the steps of blocks 502-510 are performed after receiving new user information.

Next method 500 involves determining in which cluster or sub-cluster new user information belongs. A nearest cluster is identified for new user information, as shown in block 512. In one example, the new user information is compared with each of the cluster center points and the cluster having the most similar center point is selected (i.e., the center point that is the smallest distance from the new user information).

In block 514, the method 500 identifies sub-clusters of users of the nearest cluster. In one embodiment, this involves a similar dynamic clustering technique as discussed above with respect to the entire dataset only applied to the nearest cluster rather than the entire dataset.

Method 500 further involves finding the nearest sub-cluster for the new user information, as shown in block 516. In one example, the new user information is compared with each of the sub-cluster center points and the sub-cluster having the most similar center point is selected (i.e., the center point that is the smallest distance from the new user information). Block 514 and 516 iterate until the number of user data points left in the nearest sub-cluster is equal or less than a threshold value t. Computation of t is a tradeoff between optimal accuracy, which requires a small t, and the computational cost, which would be smaller when t is larger and is computed using cross validation.

In block 518, method 500 involves comparing the new user information to the closest point in the nearest sub-cluster. If the new user information is sufficiently similar to the closest user data point in the nearest sub-cluster, the new user information is considered to be associated with that user and the new user information is associated with that existing user, as shown in block 522. If not, the new user information is considered to be for a new user, not already in the dataset and a new user is added, as shown in block 520.

In one embodiment, the method 500 further involves updating the clusters for the learning (training data) after the introduction of a new user. This does not need the full computation in the steps of blocks 502-510, but in one embodiment is accomplished by adding the new user data point to its corresponding cluster. After the introduction of sufficient new data (e.g., 5% or more), the steps of blocks 502-510 should be repeated to update the clusters.

Exemplary Computing Environment

Figure 7:
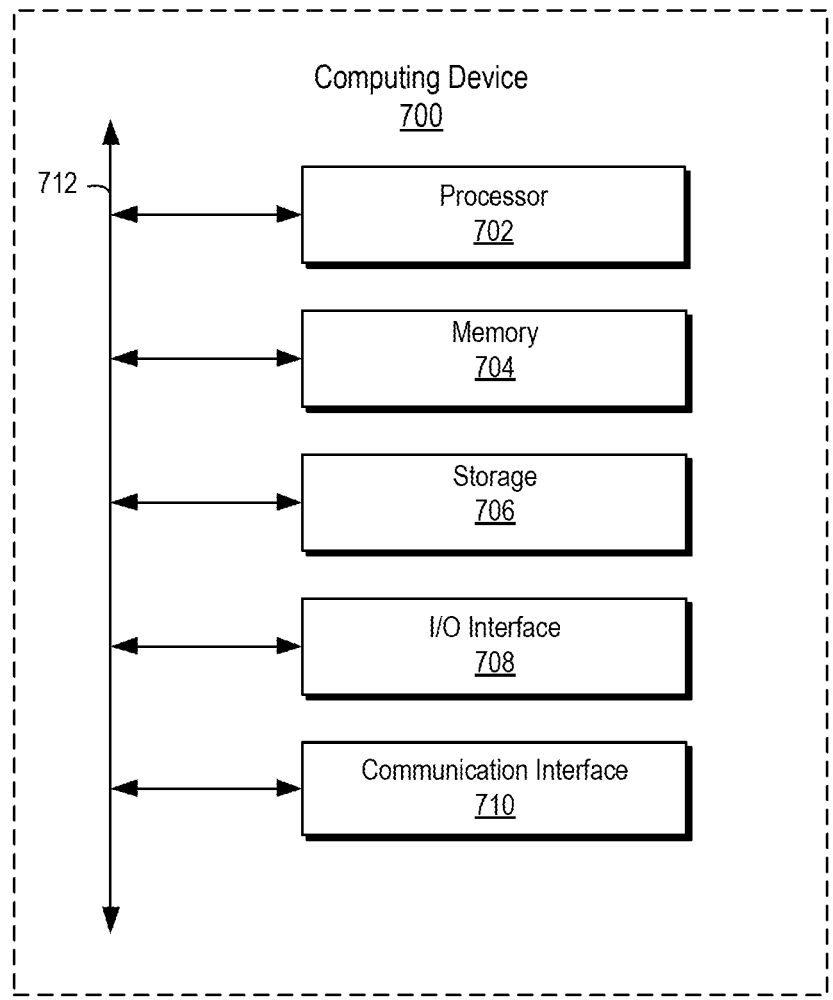
FIG. 7 is a block diagram depicting an example of a computing system used to implement certain embodiments.

Any suitable computing system or group of computing systems can be used to implement the techniques and methods disclosed herein. For example, FIG. 7 is a block diagram depicting examples of implementations of such components. The computing device 700 can include a processor 702 that is communicatively coupled to a memory 704 and that executes computer-executable program code and/or accesses information stored in memory 704 or storage 706. The processor 702 may comprise a microprocessor, an application-specific integrated circuit ("ASIC"), a state machine, or other processing device. The processor 702 can include one processing device or more than one processing device. Such a processor can include or may be in communication with a computer-readable medium storing instructions that, when executed by the processor 702, cause the processor to perform the operations described herein.

The memory 704 and storage 706 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing device 700 may also comprise a number of external or internal devices such as input or output devices. For example, the computing device is shown with an input/output ("I/O") interface 708 that can receive input from input devices or provide output to output devices. A communication interface 710 may also be included in the computing device 700 and can include any device or group of devices suitable for establishing a wired or wireless data connection to one or more data networks. Non-limiting examples of the communication interface 710 include an Ethernet network adapter, a modem, and/or the like. The computing device 700 can transmit messages as electronic or optical signals via the communication interface 710. A bus 712 can also be included to communicatively couple one or more components of the computing device 700.

The computing device 700 can execute program code that configures the processor 702 to perform one or more of the operations described above. The program code can include one or more modules. The program code may be resident in the memory 704, storage 706, or any suitable computer-readable medium and may be executed by the processor 702 or any other suitable processor. In some embodiments, modules can be resident in the memory 704. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perforin additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for determining whether to associate new user information with an existing user, the method comprising:
   clustering users in a set of users into clusters based on similarities of personal or behavioral features of the users, wherein the clustering comprises:
      dynamically weighting the personal or behavioral features of the users in the set of users, wherein weightings of personal or behavioral features below a weighting predetermined threshold are set to zero;
      applying a k-means clustering technique using the weighted personal or behavioral features; and
      iteratively clustering the users within clusters and sub-clusters until a sub-cluster size is below a threshold value;
   receiving new user information relating to a user using a device that provides the new user information via a computer network;
   identifying, by a processor, an individual sub-cluster of the sub-clusters comprising a smallest distance between personal or behavioral features of the new user information and center points of the sub-clusters;
   comparing, by the processor, the personal or behavioral features of the new user information with personal or behavioral features of an existing user in the individual sub-cluster having a size below the threshold value;
   identifying, by the processor, the user as the existing user associated with an existing user profile within the individual sub-cluster, wherein identifying the user as the existing user is based on a similarity of the personal or behavioral features of the new user information with the personal or behavioral features of the existing user within the individual sub-cluster exceeding a predetermined threshold; and
   associating, by the processor, the new user information with the existing user profile of the existing user.

2. The method of claim 1, wherein the individual sub-cluster is identified based on the similarity of the personal or behavioral features of the new user information to personal or behavioral features of the center point of the individual sub-cluster.

3. The method of claim 1, wherein identifying the individual sub-cluster is based on similarity of behavioral features of the new user information to behavioral features of the individual sub-cluster.

4. The method of claim 1, wherein the behavioral feature is interaction with a website, Internet-of-Things (IoT) device, mobile device, or in-store device.

5. The method of claim 1 further comprising determining a number of clusters using a Silhouette method and predetermined criteria.

6. The method of claim 1 further comprising determining a number of clusters using a Silhouette method that attempts to optimize the clusters such that data points inside the clusters are as similar as possible and the clusters are as dissimilar as possible from one another.

7. The method of claim 6 further comprising using a set of training data to identify an appropriate number of clusters.

8. The method of claim 1, wherein the clustering comprises initially selecting random points as cluster centers and iteratively re-clustering and reselecting cluster centers until convergence.

9. A system for determining whether to associate new user information with an existing user, the system comprising:
 a processor;
 instructions stored on a non-transitory computer readable medium, wherein when executed by the processor, the instructions perform operations comprising:
  clustering users in a set of users into clusters based on similarities of personal or behavioral features of the users, wherein the clustering comprises iteratively clustering the users within clusters and sub-clusters until a sub-cluster size is below a threshold value;
  receiving new user information relating to a user using a device that provides the new user information via a computer network;
  identifying an individual sub-cluster of the sub-clusters comprising a smallest distance between personal or behavioral features of the new user information and center points of the sub-clusters;
  comparing the personal or behavioral features of the new user information with personal or behavioral features of an existing user in the individual sub-cluster;
  identifying the user as the existing user associated with an existing user profile within the individual sub-cluster, wherein identifying the user as the existing user is based on a similarity of the personal or behavioral features of the new user information with the personal or behavioral features of the existing user within the individual sub-cluster exceeding a predetermined threshold; and
  associating the new user information with the existing user profile of the existing user.

10. The system of claim 9, wherein the individual sub-cluster is identified based on the similarity of the personal or behavioral features of the new user information to personal or behavioral features of the center point of the individual sub-cluster.

11. A non-transitory computer readable medium storing instructions, the instructions executable by a processor to perform operations comprising:
 clustering users in a set of users into clusters based on similarities of personal or behavioral features of the users, wherein the clustering comprises:
  dynamically weighting the personal or behavioral features of the users in the set of users, wherein weightings of personal or behavioral features below a weighting predetermined threshold are set to zero;
  applying a k-means clustering technique using the weighted personal or behavioral features; and
  iteratively clustering the users within clusters and sub-clusters until a sub-cluster size is below a threshold value;
 receiving new user information relating to a user using a device that provides the new user information via a computer network;
 identifying an individual sub-cluster of the sub-clusters comprising a smallest distance between personal or behavioral features of the new user information and a center point of the individual sub-cluster;
 comparing the personal or behavioral features of the new user information with personal or behavioral features of an existing user in the individual sub-cluster;
 identifying the user as the existing user associated with an existing user profile within the individual sub-cluster, wherein identifying the user as the existing user is based on a similarity of the personal or behavioral features of the new user information with the personal or behavioral features of the existing user within the individual sub-cluster exceeding a predetermined threshold; and
 associating the new user information with the existing user profile of the existing user.

12. The non-transitory computer readable medium of claim 11, the instructions further specifying operations comprising:
 creating a new user account profile with the new user information rather than associating the new user information with the existing user profile of the existing user based on the similarity of the personal or behavioral features of the new user information with the personal or behavioral features of the existing user not exceeding a predetermined threshold.

13. The non-transitory computer readable medium of claim 11, wherein the individual sub-cluster is identified based on the similarity of the personal or behavioral features of the new user information to personal or behavioral features of the center point of the best matching sub-cluster.

* * * * *